April 18, 1967  W. C. PHILLIPS ET AL  3,314,299
DRIVE MECHANISM FOR MERCHANDISE VENDING MACHINE
Original Filed Jan. 21, 1963  5 Sheets-Sheet 1

INVENTORS
WILLIAM C. PHILLIPS
RODERICK W. PHILLIPS
WILLIAM H. CALLAHAN
by: *signature*  ATTY.

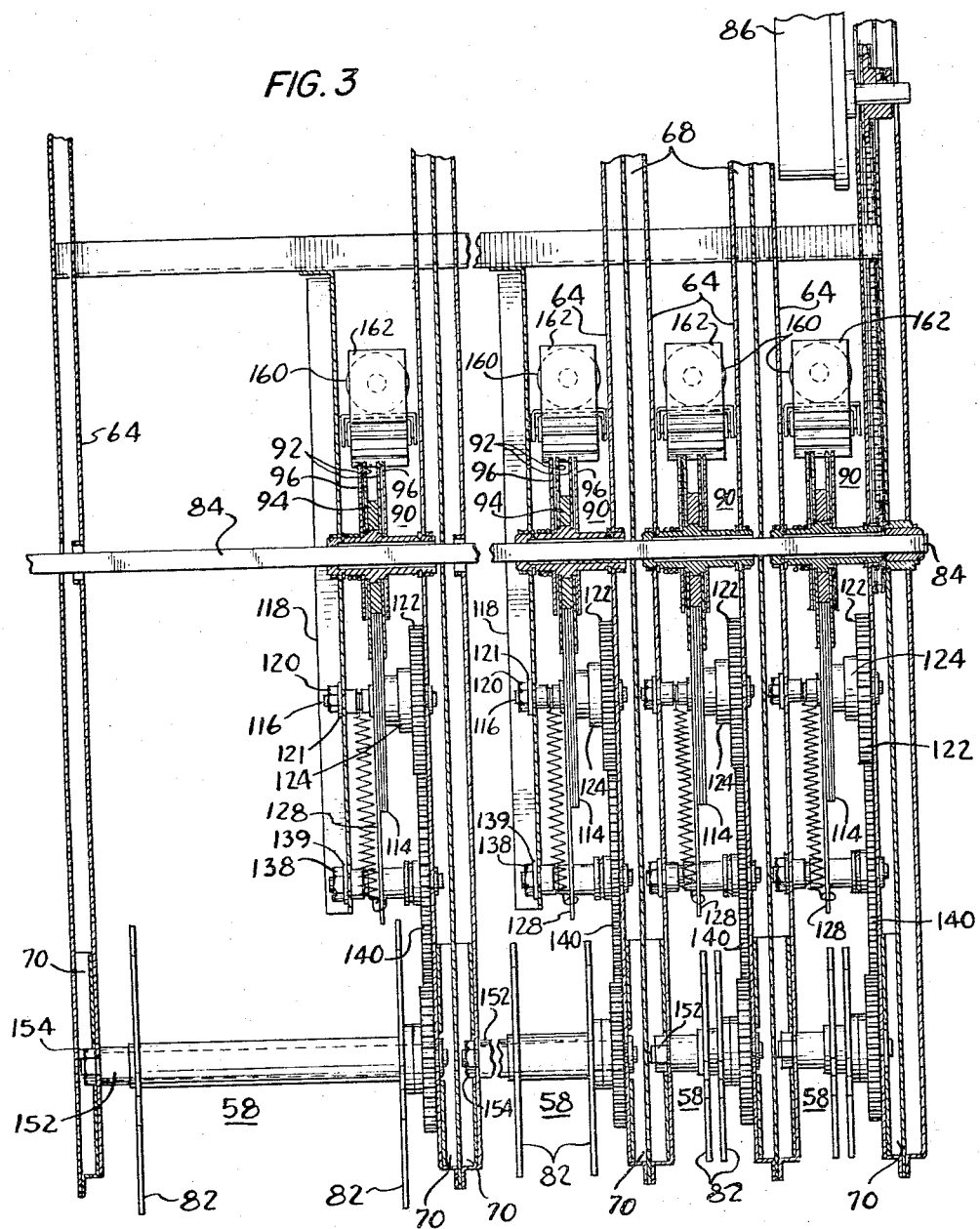

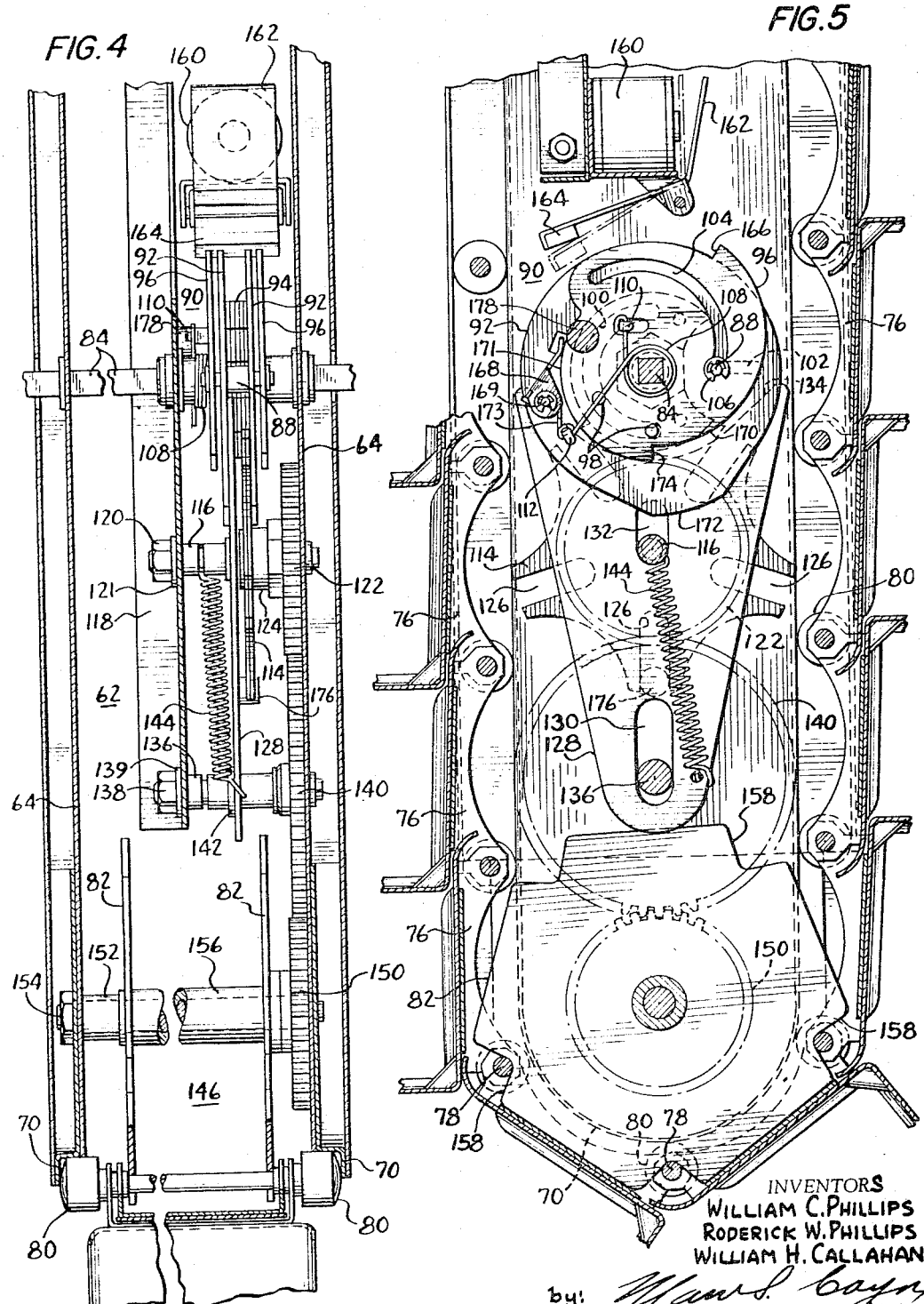

April 18, 1967  W. C. PHILLIPS ETAL  3,314,299

DRIVE MECHANISM FOR MERCHANDISE VENDING MACHINE

Original Filed Jan. 21, 1963  5 Sheets-Sheet 4

INVENTORS
WILLIAM C. PHILLIPS
RODERICK W. PHILLIPS
WILLIAM H. CALLAHAN by: [signature]
ATTY.

April 18, 1967   W. C. PHILLIPS ETAL   3,314,299
DRIVE MECHANISM FOR MERCHANDISE VENDING MACHINE
Original Filed Jan. 21, 1963   5 Sheets-Sheet 5
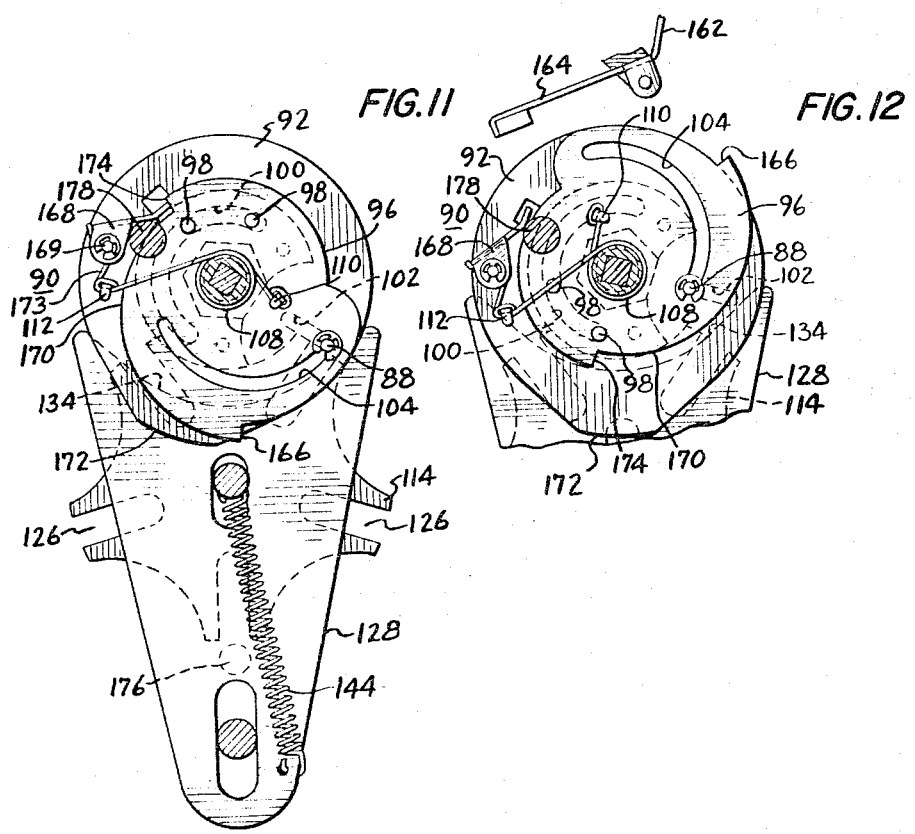
INVENTORS
WILLIAM C. PHILLIPS
RODERICK W. PHILLIPS
WILLIAM H. CALLAHAN
by: *[signature]*
ATTY.

3,314,299
DRIVE MECHANISM FOR MERCHANDISE
VENDING MACHINE
William C. Phillips, Roderick W. Phillips, and William H. Callahan, Aurora, Ill., assignors to Lektro-Vend Corp., Aurora, Ill., a corporation of Delaware
Original application Jan. 21, 1963, Ser. No. 252,630, now Patent No. 3,164,294, dated Jan. 5, 1965. Divided and this application Nov. 30, 1964, Ser. No. 435,763
12 Claims. (Cl. 74—112)

This invention relates generally to drive mechanisms and more particularly to a selective drive mechanism for use in vending machines of the type shown in copending application Ser. No. 252,630 now Patent No. 3,164,294. This application is a division of said copending application.

Briefly, the vending machine disclosed in the above-mentioned patent comprises a plurality of individual vertical storage units for storing a variety of candies or other confections. Each storage unit comprises an endless chain or belt which is rotatable about a horizontal axis. Connected to the chain is a plurality of spaced storage shelves for supporting the items to be dispensed. For each dispensing cycle, the chain is rotated a predetermined distance until the bottommost horizontal shelf is caused to tilt downwardly and dispense the goods stored thereon.

Drive means must be provided for rotating each storage unit as described. It is therefore an important object of this invention to provide a drive mechanism particularly suited for use in vending machines of the character described.

Another object is to afford a drive mechanism of the character described which may be mounted in multiple numbers on a single drive shaft, thereby providing a separate drive mechanism for each storage unit, but all driven from the same power source.

A further object is to provide a drive mechanism of the character described in which any desired one of a plurality of the same may be selectively activated to dispense the chosen product.

Other objects, features and advantages of the invention will become more apparent if the following description is viewed in light of the accompanying drawings of which:

FIG. 3 is a view taken along the line 3—3 in FIG. 1 with some of the details missing for clarity;

FIG. 4 is a front view of a portion of selective drive mechanism utilized in the vending machine illustrated in FIG. 1;

FIG. 5 is a side view of the selective drive mechanism utilized in the vending machine illustrated in FIG. 1;

FIGS. 6 through 12 are partial side views of the selective drive mechanism showing the relative positioning of the various parts of the selective drive mechanism during an operational cycle thereof.

Figure 1:
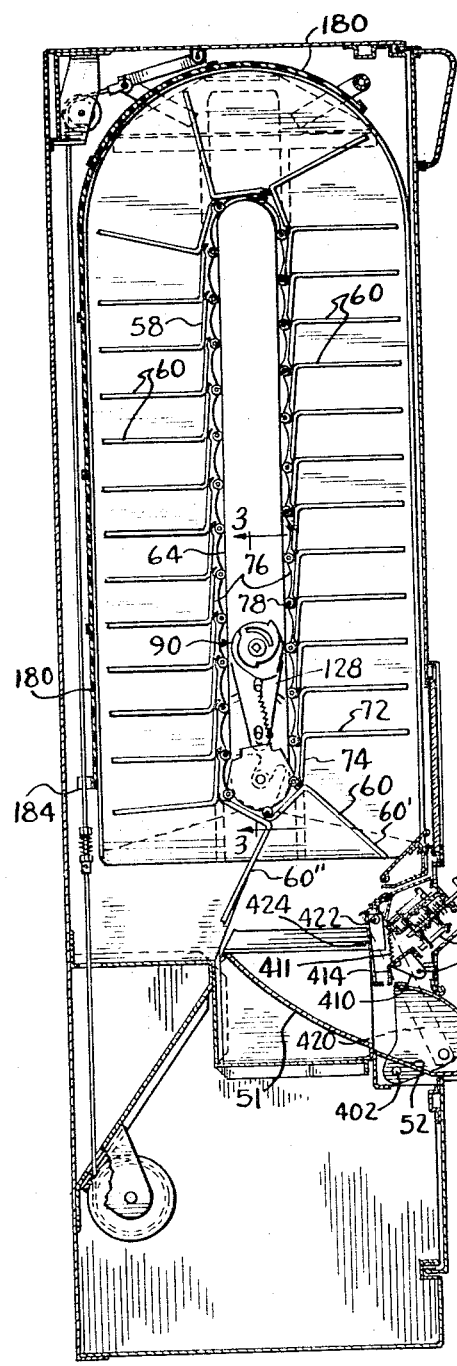
FIG. 1 is a vertical sectional view of a vending machine of the type shown in Patent No. 3,164,294 and showing the relationship of the drive mechanism of this invention thereto.
Figure 2:
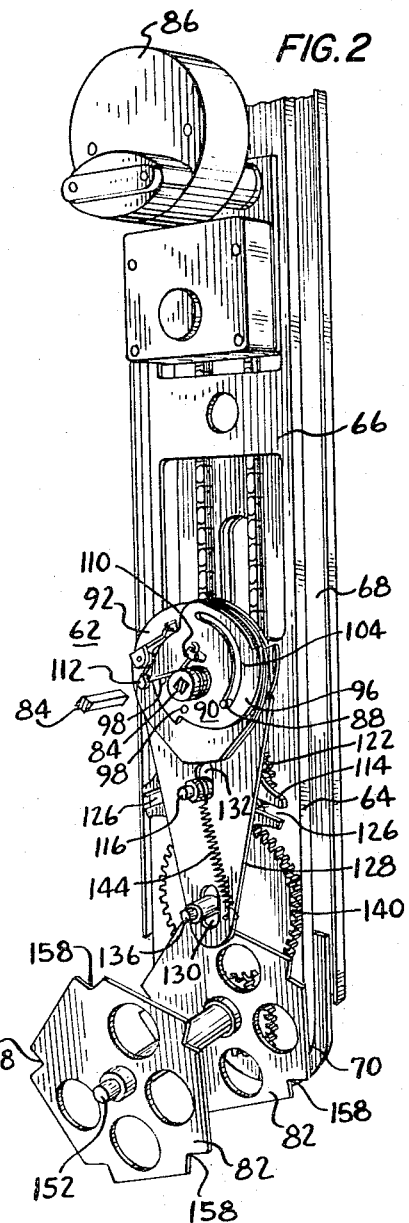
FIG. 2 is a perspective view of a portion of the selective drive mechanism utilized in the vending machine illustrated in FIG. 1.

Referring in greater detail to the various figures of the drawings, and more particularly to FIGS. 1 and 2 thereof, it will be seen that the reference numeral 58 indicates generally a vertical storage unit as operationally positioned in a vending machine of the type under consideration. The unit 58 comprises an endless chain of shelves 60 positioned between a pair of spaced rail forming elements 64. Each of the shelves 60 is substantially L-shaped in section and comprises a horizontal leg 74. The individual shelves 60 are connected together in endless chain relationship by means of brackets 76 extending from the vertical legs 74 and cooperating connecting shafts 78.

Each selector drive mechanism 62 of each endless chain-type shelf mechanism 58 is positioned between the pair of spaced rail forming elements 64 and is provided with a pair of drive sprockets 82 that engage the shelf-connecting shafts 78 as the L-shaped shelves 60 move around the bottom of the endless chain-type shelf mechanism 58. A common drive shaft 84 is provided that extends through each endless chain-type shelf mechanism 58 and the common drive shaft 84 can be driven by a drive motor 86 (FIGS. 2 and 3) through a sprocket and chain arrangement not completely shown. Positioned on the common driveshaft 84 is a drive pin moving mechanism 90 (FIGS. 1 through 12). The drive pin moving mechanism 90 comprises a pair of fixed and spaced plates 92 rigidly connected to the common drive head 84 and spaced from each other by a plurality of spacers 94, also affixed to the common driveshaft 84. Positioned exteriorly of the fixed and spaced plates 92 are a pair of movable plates 96. The movable plates 96 can rotate with respect to the fixed and spaced plates 92 and are held together by a pair of fastening rivets 98, that extend through a pair of arcuate slots 100 positioned in the fixed and spaced plates 92. The movable plates 96 are also connected by the drive pin 88 that extends through the radial slots 102 formed in the fixed and spaced plates 92 and the arcuate slot 104 formed in the movable plates 96. The drive pin 88 and roller has a pair of retaining rings affixed to each end so as to maintain the drive pin 88 in its fixed position. The movable plates 96 are spring biased by spring 108 to the position illustrated in FIG. 5 where further movement of the movable plates 96 in a counterclockwise direction is prohibited by the drive pin 88. One end of the spring element 108 is connected to the movable plate 96 at post 110 and the other end of the spring element 108 is connected to the fixed and spaced plate 92 at the post 112. Arcuate slot 104 formed in the movable plates 96 is shaped so that when the fixed and spaced plates 92 are rotating relative to the movable plates 96 the drive pin 88 moves radially outward in the radial slot 102.

Also positioned in the selector drive mechanism 62 is a star-shaped gear member 114. The star-shaped gear member 114 is rotatably secured to a mounting shaft 116, that is in turn secured to a frame member 118 by means of a nut and washer 120 and 121 and to one of the pair of spaced rail forming elements 64 by means of hammering over the end of the shaft 116 or welding or by any means known to those skilled in the art. Also rotatably attached to the mounting shaft 116 for movement in unison with the star-shaped gear 114 is first drive gear 122. The star-shaped gear member 114 and the first drive gear 122 are separated by a spacer element 124 secured to the mounting shaft 116. When the drive pin 88 is positioned at the outer radial end in slot 102 it moves into one of the star slots 126 positioned in the star shaped gear member 114. Also positioned in the selector drive mechanism 62 is a sector-shaped locking member 128. The sector-shaped locking member 128 has two elongated slots 130 and 132 formed therein. The sector-shaped locking member 128 has an arcuate drive surface 134 formed at one end and the arcuate drive surface 134 is engaged by the drive pin 88 when the drive pin 88 is at its outward radial position in the slot 102 and when in that position, moves the sector-shaped locking member 128 down, as viewed in FIG. 5. The sector-shaped locking member 128 is positioned so that its elongated slot 132 has the mounting shaft 116 positioned therein and the elongated slot 130 has the mounting shaft 136 positioned therein.

The mounting shaft 136 is secured to the frame member 118 by a nut and washer arrangement 138 and 139 respectively. The opposite end of the mounting shaft 136 is connected to one of the pair of spaced rail forming elements 64 by any means such as its end being knocked over or welded to member 64.

Rotatably secured to one end of the mounting shaft 136 is a second drive gear 140. The second drive gear 140 is always in mesh with the first drive gear 122 and rotates whenever the first drive gear 122 is rotated. One end of the sector-shaped arcuate member 128 is held in position on mounting shaft 136 by retaining ring 142 and the other end of the sector-shaped locking member 128 is positioned between the fixed and spaced plates 92 and is positioned above the star-shaped gear member 114 between plates 92. The sector-shaped locking member 128 is spring-biased so as to be normally held up against the spacers 94 which separate the fixed and spaced plates 92, as can be seen in the drawings. The sector-shaped locking member 128 is spring-biased by biasing spring 144. Biasing spring 144 is attached to the sector-shaped locking member 128 at one end thereof as shown in the drawings (FIGS. 4 and 5) and to the mounting shaft 116 also clearly illustrated in the drawings FIGS. 4 and 5).

The selector-drive mechanism 62 also includes sprocket assembly 146. The sprocket assembly 146 comprises a pair of drive sprockets 82, a third drive gear 150, and mounting shafts 152. The third drive gear 150 is in continuous mesh with the second drive gear 140 and rotates whenever the second drive gear 140 rotates. The third drive gear 150 is rotatably mounted on the mounting shaft 152 and the mounting shaft 152 is secured to one of the pair of spaced rail forming elements 64 by means of a nut 154 and to the other of the pair of spaced rail forming elements 64 by any means such as having its other end hammered over or by welding or whatever is appropriate. The driving sprockets 82 are spaced apart a predetermined distance related to the width of the associated L-shaped shelves 60 and are mounted on a rotatable shaft 156 that is secured to the third drive gear 150 so that when the third drive gear 150 rotates the driving sprockets 82 also rotate. The driving sprockets 82 have a plurality of notches 158 cut therein and the notches 158 are adapted to engage the shelf-connecting shafts 78 to thereby drive the endless chain-type shelf mechanism 58 sequentially from one dispensing position to another.

The selective drive mechanism 62 of each endless chain-type shelf mechanism 58 are all connected to a common drive shaft 84 (FIG. 3) and all of the drive pin moving mechanisms 90 of each endless chain-type shelf mechanism 58 rotate in unison with the common drive shaft 84. Therefore, there must be some means provided for activating one of the endless chain-type shelf mechanisms 58 and not activating any other of the endless chain-type shelf mechanisms 58. This is done by the provision of selector relays 160. When the purchaser selects a particular item, the purchaser feeds this information into the vending machine by activating actuators (not shown) and a selector relay 160 corresponding to that selection is energized. When the selector relay 160 is energized, it pulls in its armature 162 towards itself as illustrated in FIG. 5 in dotted lines. The energizing of the relay 160 and the pulling in of the armature 162 pivots actuator arm 164 connected to the armature 162. If desired the actuator arm 164 can be pivotably connected to armature 162 and biased for movement in unison by a spring. This prevents chattering of the armature 162 when the actuator arm 164 is moved out of the way by the spaced and fixed plates 92 as will be seen.

Figure 6:
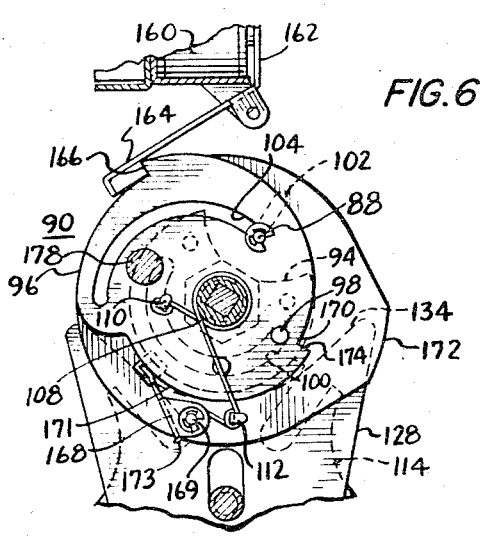

Operation of selector relay 160 moves the actuator arm 64 into the path of the drive pin moving mechanism 0. Each of the movable plates 96 has a latching edge 66 formed thereon and the latching edge 166 as it rotates in unison with the common drive shaft 84 and the fixed and spaced plates 92, engages the actuator arm 164 of selector relay 160 and is retained by the actuator arm 64 from further movement, as shown in FIG. 6. FIG. 6 represents the condition when the latching edge 166 is first engaged by the actuator arm 164 and it should be noticed that the drive pin 88 is in its inward position in the radial slot 102 and positioned in the right-hand end of the arcuate slot 104 as viewed in FIG. 6. It should be noticed that the arcuate slot 104 extends outwardly in radial fashion as the slot moves from right to left as viewed in FIG. 6, and because of this configuration, the drive pin 88 is moved from its inward position in the radial slot 102 as shown in FIG. 6 to its outward position in radial slot 102 as shown in FIGS. 8 through 11.

Figure 7:
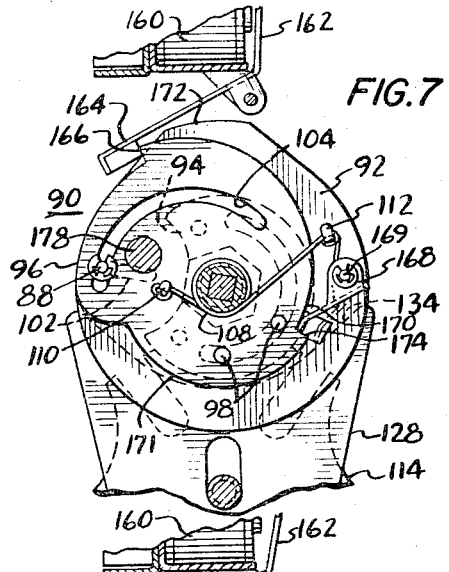
Figure 8:
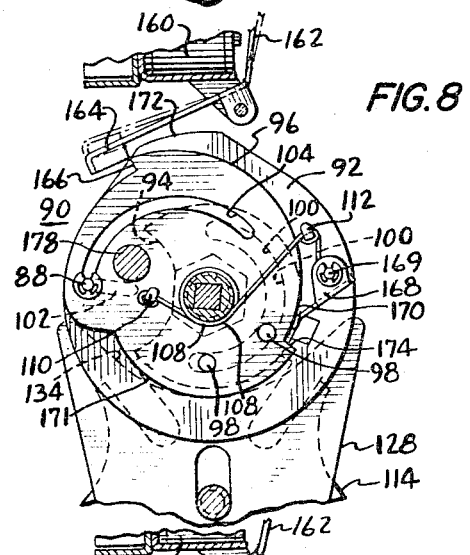
Figure 9:
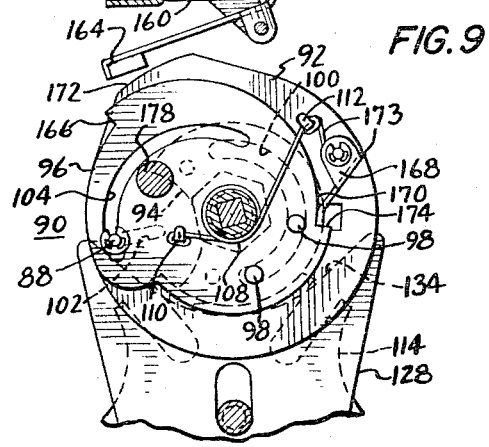

After the latching edges 166 have been engaged by the actuator arm 164, the movable plates 96 do not rotate with the fixed and spaced plates 92 as the drive-pin mechanism 90 continues rotation under the drive of the common drive shaft 84. The movable plates 96 remain stationary and in contact with the actuator arm 164 as the drive pin moving mechanism 90 continues its rotation. A movable plate spring-biased latching element 168 rotatably positioned on spring post 169 attached to the upper of the fixed and spaced plates 92 is spring biased by a wound spring 173 into contact with the cam surface 171 of the upper one of the movable plates 96, as viewed in FIG. 6. The spring biased latching element 168 rides on cam surface 171 until the latching surface 170 moves underneath the movable plate spring-biased latching element 168 as shown in FIG. 7. The movable plate spring-biased latching element 168 thereafter rotates and is biased against the latching surface 170 of the upper of the movable plates 96 as shown in solid in FIG. 7. The fixed and spaced plates 92 of the drive pin moving mechanism 90 continue rotation with respect to the movable plates 96 until the actuator arm camming surfaces 172 formed on the fixed and spaced plates 92 engage the actuator arm 164 and move the actuator arm 164 out of the way so as to enable the latching edges 166 of the movable plates 96 to move underneath the actuator arm 164 so as to thereafter move in unison with the fixed and spaced plates 92, as will be explained. This particular situation is best illustrated in FIG. 8 and as can be seen in FIG. 8 the drive pin 88 is at its outermost point in the radial slot 102 and completely over to the left in the arcuate slot 104. The drive pin 88 is now in its driving position. As soon as the movable plates 96 have cleared the actuator arm 164, the spring element 108, which biases the movable plates 96 toward the counter-clockwise position as viewed in FIGS. 6 to 12, tends to rotate the movable plates 96 back to their original position and relative to fixed and spaced plates 92. However, the movable plate spring-biased latching element 168 moves against the notch surface 174 in the upper movable plate 96 and thereby prevents the rotation of the movable plate 96 under the force of the spring element 108. Thereafter, the movable plates 96 rotate in unison with the fixed and spaced plates 92 and do so until the movable plate spring-biased latching element 168 is disengaged from the notch surface 174.

Figure 10:
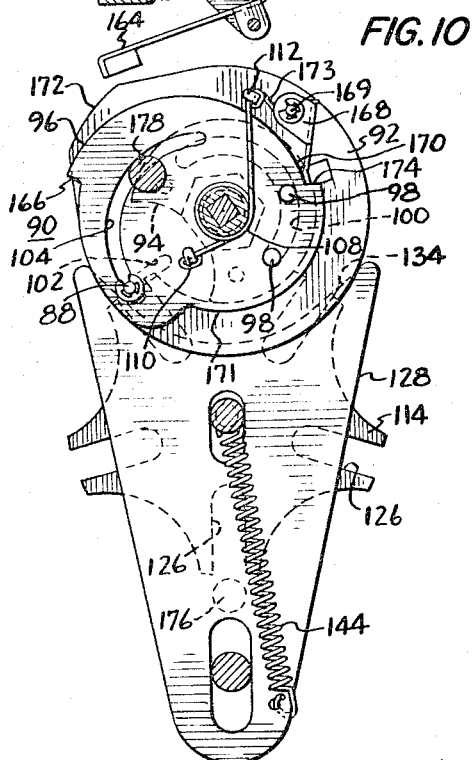

Initially, the sector-shaped locking member 128 is position up against the spacers 94 by biasing spring 144 as shown in FIG. 5 and specifically the arcuate drive surface 134 of the sector-shaped locking member 128 is positioned up against the spacers 94. As the drive pin moving mechanism 90 continues rotation (FIGS. 9 and 10), the drive pin 88 engages the arcuate drive surface 134 of the sector-shaped locking member 128 and pushes the sector-shaped locking member 128 away from the spacers 94 as best illustrated in FIG. 10 and consequently causes the pin element 176 securely positioned on the underside of the sector-shaped locking element 128 to be pushed out of the star slot 126 as is illustrated in dotted lines in FIG. 10. The purpose of the element 176 is to prevent the star-shaped gear member 114 from rotating due to the weight of the articles of merchandise supported on its associated endless chain-type shelf mechanism 58. This insures that the star-shaped gear member 114 will move only under the driving force of the drive pin 88.

Subsequently, the drive pin 88 moves into one of the appropriately positioned star slots 126 of the star-shaped gear member 114 (FIG. 10), and thereafter rotates the star-shaped gear member 114 a predetermined distance (FIG. 11), thus causing the first drive gear 122 to rotate to thereby cause the rotation of the second and third drive gears 140 and 150, respectively, and consequently the rotation of the driving sprockets 82 and therefore the movement of the L-shaped shelves 60 in the L-shaped and U-shaped rails 70 and 68 respectively of the endless chain-type shelf mechanism 58. The star-shaped gear member 114 and the L-shaped shelves 60 continue rotation as long as the drive pin 88 is positioned in an associated star slot 126, and after the drive pin 88 in its continual rotational movement moves out of the star slot 126 in the star shaped gear member 114 (FIG. 12), the star-shaped gear member 114 discontinues rotation causing a subsequent discontinuance of rotation of the first, second and third drive gears 122, 140 and 150, respectively, thus discontinuing the movement of the driving sprockets 82 and the L-shaped shelves 60. As the drive pin 88 moves upwardly along the arcuate drive surface 134 of the sector-shaped locking member 128 (FIG. 11), biasing spring 144 moves the sector-shaped locking member 128 back to its original position up against the spacers 94 of the drive pin moving mechanism 90, as can be seen in FIG. 12 again locking the star shaped gear member 114 with pin element 176 of the sector-shaped locking element 128.

An unlatching pin element 178 is fixed to the frame member 118 (FIG. 5) and is so positioned so as to move the movable plate spring-biased latching element 168 outwardly from its position in engagement with the latching surface 172 and the notched surface 174 so as to enable the movable plates 96 to be rotated back to their original position by the spring element 108, as can be seen in FIG. 12. The unlatching pin element 178 engages the movable plate spring-biased latching element 168 as the movable plate spring-biased latching element 168 rotates underneath, and moves it outwardly and allows the movable plates to rotate back to their original position as stated.

In operation, the customer makes his selection by means of a push button or the like which causes the drive motor 86 to operate. The drive motor 86 rotates a chain and sprocket arrangement, partially illustrated in FIG. 3 and which can be provided by anyone skilled in the art and rotates a common drive shaft 84. The common drive shaft 84 extends through each of the endless chain-type shelf mechanisms 58 and begins to rotate each and every of the drive pin moving mechanisms 90.

Referring to FIG. 5, if the customer's selection has activated the selector relay 160 corresponding to a particular endless chain-type shelf mechanism 58 as shown in FIG. 5, then the movement of the drive pin moving mechanism 90 of that particular endless chain-type shelf mechanism 58 will in time turn the drive sprockets 82 and therefore the L-shaped shelves 60 one dispensing position as will be explained.

As soon as the selector relay 160 associated with the endless chain-type shelf mechanism 58 selected to be operated is energized, the armature 162 and therefore the actuator arm 164 thereof moves towards the relay core, as illustrated in dotted lines in FIG. 5. Thereafter, as illustrated in FIG. 6, the latching edges 166 of the movable plates 96 engage the actuator arm 164, thus causing the cessation of rotation of the movable plates 96 with the common drive shaft 84 and the fixed and spaced plates 92. Rotation of the common drive shaft 84 and the fixed and spaced plates 92 continues and relative to the movable plates 96 until the actuator arm camming surface 172 of the fixed and spaced plates 92 engages the actuator arm 164 of the selector relay 160, as shown in FIGS. 7 and 8, and moves the actuator arm 164 out of the path of the latching edge 166. Thereafter, there would be a tendency for the movable plates 96 to rotate counter-clockwise due to the action of the biasing spring 108. However, as has been previously explained, the spring biased latching element 168 engages the latching surface 170 and notch surface 174 and prevents this rotation. During this movement of the fixed and spaced plates 92 relative to the movable plates 96, the drive pin 88 moves outwardly in its radial slot 102 so as to engage the arcuate drive surface 134 of the sector-shaped locking member 128 to therefore drive the sector-shaped locking member 128 outwardly away from the drive pin 88 to move the pin element 176 out of the rearwardly-positioned star-slot 126 to enable the star-shaped gear member 114 to be subsequently rotated. Next the drive pin 88 moves into one of the star-slots 126 and continues this movement within the star slot 126, thus driving the star-shaped gear member 114 a predetermined distance, which is the distance corresponding to one dispensing position. After the drive pin 88 has moved in the star-slot 126 a predetermined distance, it emerges therefrom and moves away from the sector-shaped locking member 128, thereby enabling the sector-shaped locking member 128 to move with the drive pin 88 so as to enable the pin element 176 formed thereon to enter the rear star-slot 126 of the star-shaped gear member 114 to prevent any movement of the star-shaped gear member 114 due to the weight of the articles of merchandise stored in the endless chain-type shelf mechanism 58.

When the star-shaped gear member 114 rotates one dispensing position the first drive gear 122 rigidly connected thereto rotates with the star-shaped gear member 114 and consequently rotates the second drive gear 140 continually in mesh with the first drive gear 122 and consequently the third drive gear 150 which is continuously in mesh with the second drive gear 150. The sprocket assembly 146, including the drive sprockets 82 therefore rotates one dispensing position. The drive sprockets 82 in their notches 158 engage the shelf-connecting shafts 78 and thereby move the chain of L-shaped shelves 60 in their U-shaped guide rails 68 and in their L-shaped guide rails 70, thus moving the endless chain of L-shaped shelves 60 one dispensing position.

Referring now to FIG. 1, it can be seen that if the endless chain of L-shaped shelves 60 is moved one dispensing position, the articles of merchandise contained in the L-shaped shelves 60 will move from the display position 60' out from under the merchandise to position 60'' and in movement from position 60' to position 60'' the article of merchandise will be dropped onto the inner delivery tray 51 and down the inclined inner delivery tray 51 to the outer delivery tray 52 under the delivery door 54. The purchaser than lifts the delivery door 54 and removes the articles of merchandise.

After the star-shaped gear member 114 has been moved one dispensing position and consequently the L-shaped shelves 60 have been moved one dispensing position, the drive-pin moving mechanism 90 is still moving inasmuch as its cycle is not completed. The common drive shaft 84 is still rotating, thereby rotating both the fixed and spaced plates 92 and the movable plates 96. The unlatching pin 178 illustrated in FIG. 4 and in phantom in FIGS. 5 through 12 is positioned on the frame member 118 and is arranged to be in the path of the spring-bias latching element 168 and when the spring-bias latching element 168 engages the latching pin element 178, the spring-bias latching element 168 is moved away from the latching surface 170 and the notch surface 174, thus enabling the biasing spring 108 to rotate the movable plates 96 in a counterclockwise position so as to be returned to their initial position, as viewed in FIG. 5. The drive motor 86 is provided with a single cycle control switch (not shown) that stops motor 86 after one cycle and such can be readily provided by one skilled in the art.

What has been described is considered to be the preferred embodiment of the invention, however many modifications and alterations can be made without departing from the scope of the appended claims which are intended to be limited only by the prior art.

What is claimed is:

1. A drive mechanism comprising:
   driving means;
   driven means;
   at least one positioning element connected to said driving means but capable of relative movement with said driving means and capable of being held in first and second positions relative to said driving means;
   selectively operated first latch means for causing said positioning element to move from said first position relative to said driving means to said second position relative to said driving means;
   a second latch means for retaining said positioning element in said second position;
   a movable member slidably connecting said positioning element to said driving means and movable from a trailing position to a leading position responsive to the movement of said positioning element from said first position to said second position relative to said driving means;
   engaging means formed in said driven means to engage said movable member when said movable member is in said leading position and movable with said movable member; and
   unlatching means positioned exterior to said driving means for releasing said second latch means after said second latch means has retained said positioning element in said second position relative to said driving means;
   whereby said driven means is selectively driven by said driving means.

2. A drive mechanism comprising:
   rotatable driving means;
   rotatable driven means;
   at least one positioning element connected to said driving means but capable of relative rotational movement with said driving means and capable of being held in first and second positions relative to said driving means;
   selectively operated first latch means for causing said positioning element to move from said first position relative to said driving means to said second position relative to said driving means;
   a second latch means for retaining said positioning element in said second position;
   a movable pin member slidably connecting said positioning element to said driving means and capable of radial movement relative to said driving means and movable from a first pin position to a second pin position responsive to the movement of said positioning element from said first position to said second position relative to said driving means;
   engaging means formed in said driven means to engage said pin member when said pin member is in said second pin position and movable with said pin member; and
   unlatching means positioned exterior to said driving means for releasing said second latch means after said second latch means has retained said positioning element in said second position relative to said driving means;
   whereby said driven means is selectively driven by said driving means.

3. A drive mechanism comprising:
   rotatable driving means;
   rotatable driven means;
   at least one spring biased positioning element connected to said driving means but capable of relative rotational movement with said driving means and capable of being held in first and second positions relative to said driving means;
   selectively operated first latch means positioned exterior to said driving means for causing said positioning element to move from said first position relative to said driving means to said second position relative to said driving means;
   second latch means for retaining said positioning element in said second position;
   a movable pin member slidably connecting said positioning element to said driving means and capable of radial movement relative to said driving means and movable from a first pin position to a second pin position responsive to the movement of said positioning element from said first position to said second position relative to said driving means;
   engaging means formed in said driven means to engage said pin member when said pin member is in said second pin position and movable with said pin member; and
   unlatching means positioned exterior to said driving means for releasing said second latch means after said second latch means has retained said positioning element in said second position relative to said driving means;
   whereby said driven means is selectively driven by said driving means.

4. A drive mechanism comprising:
   rotatable driving means;
   rotatable driven means;
   said driving means comprising a rotatable driving shaft;
   at least one plate rigidly secured to said driving shaft;
   at least one plate rotatably secured to said driving shaft and capable of relative rotational movement with said first-mentioned plate and capable of being held in first and second positions relative to said first-mentioned plate;
   spring means biasing said second-mentioned plate into said first position relative to said first-mentioned plate;
   a selectively operated first latch means selectively engaging said second-mentioned plate to cause the movement of said second-mentioned plate from said first position relative to said first-mentioned plate to said second position relative to said first-mentioned plate;
   a spring biased second latch means positioned on said first-mentioned plate for retaining said second-mentioned plate in said second position relative to said first-mentioned plate;
   a movable pin member slidably connecting said first-mentioned plate and said second-mentioned plate and capable of radial movement with respect to said first-mentioned plate and movable from a first pin position to a second pin position responsive to the movement of said second-mentioned plate from said first position to said second position relative to said first-mentioned plate;
   engaging means formed in said driven means to engage said pin member when said pin member is in said second pin position and movable with said pin member; and
   unlatching means positioned exterior to said driving means for releasing said second spring biased latch means after said second spring biased latch means has retained said second-mentioned plate in said second position relative to said first-mentioned plate;
   whereby said driven means is selectively driven by said driving means.

5. A drive mechanism comprising:
   rotatable driving means;
   rotatable driven means;
   said driving means comprising a rotatable driving shaft;
   a pair of spaced plates rigidly secured to said driving shaft;
   a pair of movable plates positioned exterior to said pair of spaced plates and rotatably secured to said driving shaft and capable of relative rotational movement with said spaced plates and capable of being held in first and second positions relative to said pair of spaced plates;

spring means biasing said movable plates into said first position relative to said spaced plates;

a selectively operated first latch means selectively engaging said pair of movable plates to cause the movement of said movable plates from said first position relative to said pair of spaced plates to said second position relative to said pair of spaced plates;

a spring biased second latch means positioned on one of said pair of spaced plates for retaining said pair of movable plates in said second position relative to said pair of spaced plates;

a movable pin member slidably connecting said pair of spaced plates and said pair of movable plates and capable of radial movement from a first pin position to a second pin position responsive to the movement of said movable plates from said first position to said second position relative to said spaced plates;

engaging means formed in said driven means to engage said pin member when said pin member is in said second pin position and movable with said pin member; and unlatching means positioned exterior to said driving means for releasing said second latch means after said second latch means has retained said movable plates in said second position relative to said spaced plates;

whereby said driven means is selectively driven by said driving means.

6. A drive mechanism comprising:
a rotatable driving means;
rotatable driven means;
said driving means comprising a rotatable driving shaft;
a pair of spaced plates rigidly secured to said driving shaft;
a pair of movable plates positioned exterior to said pair of spaced plates and rotatably secured to said driving shaft and capable of relative rotational movement with said spaced plates and capable of being held in first and second positions relative to said pair of spaced plates;

spring means biasing said movable plates into said first position relative to said spaced plates;

said pair of movable plates each having a first notch and at least one movable plate having a second notch formed thereon;

a selectively operated first latch means positioned exterior to said driving means and selectively engaging said first notches on said pair of movable plates to cause the movement of said pair of movable plates from said first position relative to said pair of spaced plates to said second position relative to said pair of spaced plates;

a spring biased second latching means positioned on one of said spaced plates for engaging said second notch on said pair of movable plates for retaining said pair of movable plates in said second position relative to said pair of spaced plates;

a movable pin member slidably connecting said pair of spaced plates and said pair of movable plates and capable of radial movement from a first pin position to a second pin position responsive to the movement of said movable plates from said first position to said second position relative to said spaced plates;

engaging means formed in said driven means to engage said pin member when said pin member is in said second pin position and movable with said pin member; and unlatching means positioned exterior to said driving means for releasing said second latch means after said second latch means has retained said movable plates in said second position relative to said spaced plates;

whereby said driven means is selectively driven by said driving means.

7. A drive mechanism comprising:
rotatable driving means;
rotatable driven means;
said driving means comprising a rotatable driving shaft;
a pair of spaced plates rigidly secured to said driving shaft;
a pair of movable plates positioned exterior to said pair of spaced plates and rotatably secured to said driving shaft and capable of relative rotational movement with said pair of spaced plates and capable of being held in first and second portions relative to said pair of spaced plates;

spring means biasing said movable plates into said first position relative to said spaced plates;

at least one of said pair of movable plates having a first notch and at least one of said movable plates having a second notch formed thereon;

a selectively operated first latch means positioned exterior to said driving means and selectively engaging said first notch on said pair of movable plates to cause the movement of said movable plates from said first position relative to said pair of spaced plates to said second position relative to said pair of spaced plates;

a spring biased second latching means positioned on one of said spaced plates for engaging said second notch on said pair of movable plates for retaining said pair of movable plates in said second position relative to said pair of spaced plates;

a movable pin member slidably connecting at least one of said pair of spaced plates and at least one of said pair of movable plates and capable of radial movement from a first pin position to a second pin position responsive to the movement of said movable plates from said first position to said second position relative to said spaced plates; and engaging means formed in said driven means to engage said pin member when said pin member is in said second pin position and movable with said pin member;

whereby said driven means is selectively driven by said driving means.

8. A drive mechanism comprising:
driving means;
driven means;
at least one positioning element connected to said driving means but capable of relative movement with said driving means and capable of being held in first and second positions relative to said driving means;

selectively operated first latch means for causing said positioning element to move from said first position relative to said driving means to said second position relative to said driving means;

a second latch means for retaining said positioning element in said second position;

a movable member slidably connecting said positioning element to said driving means and movable from a first member position to a second member position responsive to the movement of said positioning element from said first position to said second position relative to said driven means;

engaging means formed in said driven means to engage said movable member when said movable member is in said second member position and movable with said movable member;

whereby said driven means is selectively driven by said driving means.

9. A drive mechanism comprising:
rotatable driving means;
rotatable driven means;

at least one position element connected to said driving means but capable of relative movement with said driving means and capable of being held in first and second positions relative to said driving means;

selectively operated first latch means for causing said positioning element to move from said first position relative to said driving means to said second position relative to said driving means;

a second latch means for retaining said positioning element in said second position;

a movable member slidably connecting said positioning element to said driving means and movable from a first member position to a second member position responsive to the movement of said positioning element from said first position to said second position relative to said driving means;

engaging means formed in said driven means to engage said movable member when said movable member is in said second member position and movable with said movable member;

said engaging means comprising a slotted gear member having a plurality of slots regularly formed and spaced therein for receiving said movable member when said movable member is in said second member position and for movement therewith as long as said movable member is engaged by any of said plurality of slots;

said driven means further comprising a gear arrangement rotatable with said engaging means;

a gear unlock member having a stop portion thereof normally positioned in one of said plurality of slots in said gear member and engageable by said movable member when said movable member is in said second member position for movement therewith to remove said stop portion from said one slot to enable said gear member to move with said movable member when said movable member is in said second member position; and unlatching means positioned exterior to said driving means for releasing said second latch means after said second latch means has retained said positioning element in said second position relative to said driving means;

whereby said driven means is selectively driven by said driving means.

10. A drive mechanism comprising:

rotatable driving means;

rotatable driven means;

at least one positioning element connected to said driving means but capable of relative movement with said driving means and capable of being held in first and second positions relative to said driving means;

selectively operated first latch means for causing said positioning element to move from said first position relative to said driving means to said second position relative to said driving means;

a second latch means for retaining said positioning element in said second position;

a movable pin member slidably connecting said positioning element to said driving means and capable of radial movement relative to said driving means and movable from a first pin position to a second pin position responsive to the movement of said positioning element from said first position to said second position relative to said driving means;

engaging means formed in said driven means to engage said pin member when said pin member is in said second pin position and movable with said pin member; and unlatching means positioned exterior to said driving means for releasing said second latch means after said second latch means has retained said positioning element in said second position relative to said driving means;

whereby said driven means is selectively driven by said driving means.

11. A drive mechanism comprising:

rotatable driving means;

rotatable driven means;

at least one positioning element connected to said driving means but capable of relative rotational movement with said driving means and capable of being held in first and second positions relative to said driving means;

spring means normally urging said positioning element into said first position relative to said driving means;

selectively operated first latch means positioned exterior to said driving means for causing said positioning element to move from said first position relative to said driving means to said second position relative to said driving means;

second latch means for retaining said positioning element in said second position;

a movable pin member slidably connecting said positioning member to said driving means and capable of radial movement and movable from a first pin position to a second pin position responsive to the movement of said positioning element from said first position to said second position relative to said driving means;

engaging means formed in said driven means to engage said pin member when said pin member is in said second pin position and movable with said pin member;

said engaging means comprising a slotted gear member having a plurality of solts regularly formed and spaced therein for receiving said pin member when said pin member is in said second pin position and for movement therewith as long as said pin member is engaged by any of said plurality of slots;

said driven means further comprising a gear arrangement rotatable with said engaging means;

a gear unlock member having a stop portion thereof normally positioned in one of said plurality of slots in said gear member and engageable by said pin member when said pin member is in said second pin position for movement therewith to remove said stop portion from said one slot to enable said gear member to move with said pin member when said pin member is in said second pin position; and unlatching means positioned exterior to said driving means for releasing said second latch means after said second latch means has retained said position element in said second position relative to said driving means;

whereby said driven means is selectively driven by said driving means.

12. A drive mechanism comprising:

rotatable driving means;

rotatable driven means;

said driving means comprising a rotatable driving shaft;

at least one plate rigidly secured to said driving shaft;

at least one movable plate rotatably secured to said driving shaft and capable of relative rotational movement with said first-mentioned plate and capable of being held in first and second positions relative to said first-mentioned plate;

spring means normally urging said movable plate into said first position relative to said first-mentioned plate;

a selectively operated first latch means selectively engaging said movable plate to cause the movement of said movable plate from said first position relative to said first-mentioned plate to said second position relative to said first-mentioned plate;

spring biased second latch means for retaining said movable plate in said second position;
a movable pin member slidably connecting said first-mentioned plate and said movable plate and capable of radial movement with respect to said first-mentioned plate and movable from a first pin position to a second pin position responsive to the movement of said movable plate from said first position to said second position relative to said first-mentioned plate;
engaging means formed in said driven means to engage said pin member when said pin member is in said second pin position and movable with said pin member;
said engaging means comprising a slotted gear member having a plurality of slots regularly formed and spaced therein for receiving said pin member when said pin member is in said second pin position and for movement therewith as long as said pin member is engaged by any of said plurality of slots;
said driven means further comprising a gear arrangement rotatable with said engaging means;
a gear unlock member having a stop portion thereof normally positioned in one of said plurality of slots in said gear member and engageable by said pin member when said pin member is in said second pin position for movement therewith to remove said stop portion from said one slot to enable said gear member to move with said pin member when said pin member is in said second pin position; and
unlatching means positioned exteriorly to said driving means for releasing said second latch means after said second latch means has retained said movable plate in said second position relative to said first-mentioned plate;
whereby said driven means is selectively driven by said driving means.

References Cited by the Examiner

UNITED STATES PATENTS

| | | | |
|---|---|---|---|
| 1,079,048 | 11/1913 | Homans | 74—116 |
| 1,389,267 | 8/1921 | Norton et al. | 192—20 |
| 1,891,101 | 12/1932 | Le Count | 74—112 |
| 1,985,825 | 12/1934 | Harrison | 192—20 |
| 2,164,309 | 7/1939 | Collins. | |
| 2,241,489 | 5/1941 | Steiner | 221—125 |
| 2,540,750 | 2/1951 | Morrison | 248—2 |
| 2,695,147 | 11/1954 | Castricone | 248—2 |
| 2,868,032 | 1/1959 | Miller | 74—84 X |
| 3,001,671 | 9/1961 | Pryor | 221—125 |
| 3,021,030 | 2/1962 | Thompson | 221—77 |
| 3,057,512 | 10/1962 | Shurtz | 221—77 |

FOREIGN PATENTS 47,945  5/1911  Austria.

MILTON KAUFMAN, *Primary Examiner.*

DON A. WAITE, BROUGHTON G. DURHAM, FRED C. MATTERN, *Examiners.*

B. W. WYCHE, J. A. MARSHALL, D. THIEL,
*Assistant Examiners.*